(12) United States Patent
Emoto et al.

(10) Patent No.: US 8,404,152 B2
(45) Date of Patent: Mar. 26, 2013

(54) FLUORESCENT SUBSTANCE AND PRODUCTION METHOD THEREOF, AND LIGHT EMITTING DEVICE

(75) Inventors: Hideyuki Emoto, Machida (JP); Toshiaki Nagumo, Machida (JP)

(73) Assignee: Denki Kagaku Kogyo Kabushiki Kaisha, Tokyo (JP)

( * ) Notice: Subject to any disclaimer, the term of this patent is extended or adjusted under 35 U.S.C. 154(b) by 420 days.

(21) Appl. No.: 12/515,335

(22) PCT Filed: Nov. 20, 2007

(86) PCT No.: PCT/JP2007/072443
§ 371 (c)(1),
(2), (4) Date: May 18, 2009

(87) PCT Pub. No.: WO2008/062781
PCT Pub. Date: May 29, 2008

(65) Prior Publication Data
US 2010/0053932 A1   Mar. 4, 2010

(30) Foreign Application Priority Data

Nov. 20, 2006   (JP) ................................ 2006-312369

(51) Int. Cl.
*H01L 33/00* (2010.01)
*C09K 11/64* (2006.01)
*C09K 11/08* (2006.01)

(52) U.S. Cl. ................................. 252/301.4 F; 313/483

(58) Field of Classification Search ............ 252/301.4 F; 313/483
See application file for complete search history.

(56) References Cited

U.S. PATENT DOCUMENTS

| 7,544,310 B2 * | 6/2009 | Hirosaki ................ 252/301.4 F |
| 2007/0108896 A1 | 5/2007 | Hirosaki |

FOREIGN PATENT DOCUMENTS

| CN | 1839191 A | 9/2006 |
| DE | 11 2005 000 044 | 7/2006 |
| EP | 1 867 698 A1 | 12/2007 |
| JP | 05-152609 | 6/1993 |
| JP | 07-099345 | 4/1995 |
| JP | 9-90416 | 4/1997 |
| JP | 10-242513 | 9/1998 |
| JP | 2002-363554 | 12/2002 |
| JP | 2003-124527 | 4/2003 |
| JP | 2003-336059 | 11/2003 |
| JP | 2005-255885 | 9/2005 |
| JP | 2005-255895 | 9/2005 |
| WO | WO 2005/087896 | * 9/2005 |
| WO | WO 2005/087896 A1 | 9/2005 |
| WO | WO 2006/101095 A1 | 9/2006 |

OTHER PUBLICATIONS

Van Krevel, J.W.H., "On New Rare-Earth Doped M-Si-Al-O-N Materials", Technische Universiteit Eindhoven (2000), pp. 145-161.
Okubo, Kazuaki, et al., "Absolute Fluorescent Quantaum Efficiency of NHS Phosphor Standard Samples", J. Illum., Engng. Inst. Jpn., 83, N. 2, (1999).
International Search Report issued in PCT/JP2007/072443 on Feb. 26, 2008.
International Preliminary Report on Patentability and Written Opinion issued in PCT/JP2007/072443 on May 26, 2009.
Hirosaki, Naoto et al: "Characterization and properties of green-emitting β-SiAlON:Eu$^{2+}$ powder phosphors for white light-emitting diodes" Applied Physics Letters, AIP, American Institute of Physics, Melville, NY, US, vol. 86, No. 21, May 17, 2005, pp. 211905-211905.
Extended European Search Report issued Nov. 30, 2009.

* cited by examiner

*Primary Examiner* — Carol M Koslow
(74) *Attorney, Agent, or Firm* — Stein McEwen, LLP (57) ABSTRACT

Offered is a fluorescent substance consisting of Eu-activated β-sialon and capable of enhancing the brightness of a light emitting device such as a white LED using blue or ultraviolet light as a light source. The fluorescent substance has as its main constituent a β-sialon represented by the general formula $Si_{6-z}Al_zO_zN_{8-z}$ and containing Eu, wherein the spin density is $2.0 \times 10^{17}$/g or less as measured by electron spin resonance spectroscopy corresponding to an absorption of $g = 2.00 \pm 0.02$ at 25° C. In the above fluorescent substance, it is preferable that lattice constant a of the β-sialon be 0.7608-0.7620 nm, the lattice constant c be 0.2908-0.2920 nm, and the Eu content be 0.1-3 mass %.

9 Claims, 1 Drawing Sheet

FLUORESCENT SUBSTANCE AND PRODUCTION METHOD THEREOF, AND LIGHT EMITTING DEVICE

CROSS-REFERENCE TO RELATED APPLICATIONS

This application claims the benefit of PCT International Patent Application No. PCT/JP2007/072443, filed Nov. 20, 2007, and Japanese Patent Application No. 2006-312369, filed Nov. 20, 2006, in the Japanese Patent Office, the disclosures of which are incorporated herein by reference.

BACKGROUND OF THE INVENTION

1. Field of the Invention

The present invention relates to a fluorescent substance usable in various light-emitting devices such as a white light-emitting diode (white LED) having a blue light-emitting diode (blue LED) or an ultraviolet light-emitting diode (UV LED), and a light-emitting device using the substance.

2. Description of the Related Art

Patent Document 1 discloses a white LED that combines a fluorescent substance with a semiconductor light-emitting device that emits visible light of shorter wavelengths in the blue to violet range, so as to mix the light emitted from the semiconductor light-emitting device with light wavelength-converted by the fluorescent substance, to result in a white light.

On the other hand, fluorescent substances using silicates, phosphates, aluminates and sulfates as the matrix material and transition metals or rare earth metals in the luminescent center are widely known.

With the increased output power of a white LED, the demand for heat resistance and durability of fluorescent substances has become greater. However, when using the conventionally known fluorescent substances indicated above, reduced luminosity of the fluorescent substances caused by use in higher temperature environments and degradation of the fluorescent substances due to prolonged exposure to blue light and UV excitation sources can result in reduced luminosity and color shifting in the white LED.

Recently, fluorescent substances consisting of nitrides and oxynitrides which have a stable crystal structure have been the object of much interest as fluorescent substances with little luminosity reduction with increased temperature and excellent durability.

Typical example of nitride or oxynitride fluorescent substances are sialons, which are solid solutions of silicon nitride. Like silicon nitride, sialons can have either a α-type or a β-type crystal structure. α-sialons which are containing with specific rare earth elements are known to have effective fluorescent properties, and their application to the white LED and the like has been considered (see Patent Documents 2-4 and Non-Patent Document 1).

On the other hand, β-sialons which are containing with rare earth elements have also been discovered to have similar fluorescent properties (see Patent Document 5).

β-sialons are solid solutions of β-silicon nitride, having the Si positions of the β-silicon nitride crystal substituted by Al and the N positions substituted by O. Since there are two formula weights of atoms in a unit lattice, a general formula of $Si_{6-z}Al_zO_zN_{8-z}$ is used. Here, z is 0-4.2, so the range of the solid solution is very broad, and the molar ratio of (Si, Al)/(N, O) must be maintained at 3/4. The crystal structure of β-type silicon nitride has $P6_3$ or $P6_3/m$ symmetry, defined as a structure having ideal atomic positions (see Patent Document 5).

Additionally, in general, a β-sialon can be obtained by adding, as raw materials, silicon oxide and aluminum nitride, or aluminum oxide and aluminum nitride, to silicon nitride, and heating.

By including $Eu^{2+}$ in the crystal structure of β-sialon, it forms a fluorescent substance known as Eu-activated β-sialon that, upon excitation by UV to blue light, emits green light in the 520-550 nm wavelength range, which can be used as the green light component in a light-emitting device such as a white LED. Even among fluorescent substances that have been activated by $Eu^{2+}$, Eu-activated β-sialons have an extremely sharp emission spectrum, and are fluorescent substances that are suitable for generating the green light components of backlight sources in liquid crystal display panels which require narrow bands of red, green and blue light.

Patent Document 1: Japanese Patent No. 2927279
Patent Document 2: Japanese Patent No. 3668770
Patent Document 3: Japanese Patent No. 3726131
Patent Document 4: Japanese Patent Application, Publication No. 2003-124527A
Patent Document 5: Japanese Patent Application, Publication No. 2005-255895A
Non-Patent Document 1: W. J. van Krebel, "On new rare-earth doped M-Si—Al—O—N materials", TU Eindhoven, The Netherlands, pp. 145-161 (1998).

SUMMARY OF THE INVENTION

However, conventional fluorescent substances having Eu-activated β-sialons as their main constituents have poor luminous efficiency, and are thus difficult to put to practical use.

The present invention takes the above-mentioned problem into consideration, and has the object of offering a fluorescent substance having Eu-activated β-sialon as the main constituent, capable of achieving high luminous efficiency.

The present invention offers a fluorescent substance having as a main constituent a β-sialon represented by the general formula Si6-zAlzOzN8-z and containing Eu, wherein the spin density is 2.0×1017/g or less as measured by electron spin resonance spectroscopy corresponding to an absorption of g=2.00±0.02 at 25° C.

A fluorescent substance having of this type, when excited by UV to visible light in a broad range of wavelengths, emits a green light with wavelengths mainly above 520 nm and below 550 nm with high efficiency, and is thus exceptional as a green fluorescent substance. Therefore, it is suitable for use alone or in combination with other fluorescent substances in various types of light-emitting devices, particularly white LEDs having UV LEDs or blue LEDs as light sources.

Additionally, the present invention offers a light-emitting device comprising the aforementioned fluorescent substance and a light source.

Since such a light-emitting device uses a fluorescent substance having the aforementioned β-sialon as the main constituent, it reflects the thermally and chemically stable characteristics of β-sialon, having little luminosity loss even when used at high temperatures and having a long lifespan.

Additionally, the present invention offers a method of producing a fluorescent substance comprising a first step of forming β-sialon containing Eu, and a second step of subjecting it to a heat treatment for at least 1 hour in a temperature range of at least 1450° C. and at most 1650° C. to reduce the crystal defect density.

Additionally, the present invention offers a method of producing a fluorescent substance comprising a first step of forming β-sialon containing Eu, and a second step of subjecting it to a heat treatment in a temperature range of at least 1200° C. and at most 1550° C. in a vacuum, and further subjecting it to an acid treatment to reduce the crystal defect density.

Additionally, the present invention offers a method of producing a fluorescent substance comprising a first step of forming β-sialon containing Eu, and a second step of subjecting it to a heat treatment in a temperature range of at least 1300° C. and at most 1600° C. in an inert gas atmosphere having a gas other than nitrogen as its main constituent with a partial pressure for nitrogen of 10 kPa or less, and further subjecting it to an acid treatment to reduce the crystal defect density.

With either of the above methods of producing a fluorescent substance, it is possible to produce, with good reproducibility, a fluorescent substance excelling in light generating properties as indicated above, simply by subjecting Eu-activated β-sialon obtained by a conventionally known method to a simple heat treatment or acid treatment.

The fluorescent substance of the present invention is a fluorescent substance having as its main constituent a Eu-activated β-sialon capable of achieving high luminous efficiency. Additionally, the methods of production of a fluorescent substance of the present invention enable highly reproducible production of fluorescent substances excelling in light-generating properties. Additionally, by using a fluorescent substance capable of achieving high luminous efficiency as indicated above, the light-emitting device of the present invention is capable of achieving a high luminosity.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Herebelow, modes for carrying out the present invention shall be explained in detail together with the history of the invention.

<History of the Invention>

As already explained, conventional fluorescent substances having Eu-activated β-sialon as the main constituent have poor luminous efficiency, and light-emitting devices such as white LEDs using them cannot achieve adequate luminosity, making them difficult to put into practice.

The fluorescent substance of the present embodiment was developed in view of the above-described problems in order to offer a fluorescent substance consisting of Eu-activated β-sialon capable of attaining high luminosities in a white light-emitting device having as a light source a blue to UV light emitted from a blue LED or UV LED.

In other words, the main constituent of the fluorescent substance of the present embodiment is a substance having $Eu^{2+}$ as luminescent centers in host crystals of β-sialon represented by the general formula $Si_{6-z}Al_zO_zN_{8-z}$ (where z is 0 to 4.2). Since fluorescence occurs as a result of electron transitions in the ions forming the luminescent centers, it is crucial to reduce the light absorption of the host crystals themselves as much as possible in order to raise the luminous efficiency.

With the aim of studying the influence of host crystals on Eu-activated β-sialon, the present inventors compared the absorption properties with those of β-sialon not containing Eu, and discovered that about 10% to 30% of the incident light across a broad band of wavelengths from UV to visible light is absorbed in the Eu-activated β-sialon, thus causing large reductions in the luminous efficiency.

Furthermore, the present inventors placed their sights on unpaired electrons caused by crystal defects as a possible absorption factor across a broad range of wavelengths, and performed electron spin resonance (ESR) in order to study the state thereof. ESR as used herein refers to the phenomenon whereby the energy levels of unpaired electrons are split in a magnetic field due to the Zeeman effect, enabling the electrons to absorb electromagnetic energy in the same amount as the difference between the split energy levels. From the absorption strength and absorbed wavelengths of the absorption spectra obtained by ESR, it is possible to extract information such as the number of unpaired electrons present (spin density) and their states.

Additionally, the present inventors studied Eu-activated sialon by ESR, as a result of which they discovered that unpaired electrons that exist due to crystal defects absorb excitation light and fluorescent light from $Eu^{2+}$, and the absorption is not accompanied by emission, thus reducing the luminous efficiency. Furthermore, as a result of considering various synthesis methods and the like for fluorescent substances consisting of Eu-activated β-sialon with a view to reducing the number of unpaired electrons existing due to structural defects, they discovered that the number of unpaired electrons can be reduced and the luminous efficiency greatly improved by subjecting β-sialon, which has once been synthesized at a high temperature, to a heat treatment at a temperature lower than the synthesis temperature, and in some cases further subjecting to an acid treatment, thereby resulting in the fluorescent substance of the present embodiment.

<Fluorescent Substance>

The fluorescent substance of the present embodiment has, as its main constituent, a substance having $Eu^{2+}$ as luminescent centers in host crystals of β-sialon represented by the general formula $Si_{6-z}Al_zO_zN_{8-z}$.

Absorption and emission occur as a result of electron transitions between the 4f orbital and 5d orbital of $Eu^{2+}$. The emitted color depends on the state of the crystal field around the $Eu^{2+}$. When β-sialon is used as the host crystal, a green light having a main wavelength of 520-550 nm is created. In this fluorescent substance, it is important for the 4f electrons in the luminescent centers to be efficiently excited and to emit light without converting it to heat, but aside therefrom, it is also important to suppress absorption not accompanied by emission in areas unrelated to luminescence, such as in the host crystals themselves, in order to raise the luminous efficiency of the fluorescent substance.

The fluorescent substance of the present invention is essentially such that the spin density corresponding to an absorption of $g=2.00\pm0.02$ at room temperature (25° C.) in measurements by electron spin resonance is $2.0\times10^{17}/g$ or less. When this condition is satisfied, the aforementioned condition that the host crystals themselves do not absorb light not accompanied by emission as much as possible is also satisfied, as a result of which a fluorescent substance excelling in luminescence properties is obtained.

Spin density refers to the number of spins measured by ESR per unit mass determined by dividing with the mass of the sample provided for measurement. There is a close relationship between number of spins and crystal defects in the vicinity of g=2. In particular, in a fluorescent substance having Eu$^{2+}$-doped β-sialon as the main constituent, the Eu$^{2+}$ can tend to enter into the β-sialon crystals and increase the defect density, thus increasing the number of unpaired electrons that can cause reductions in the luminous efficiency. In particular, a spin density in excess of $2.0\times10^{17}$/g can greatly reduce the luminous efficiency, and is thus not favorable in practice.

The lattice constant of β-sialon is primarily governed by the number of substitutions of Si—N bonds with Al—O bonds, in other words, the value z. The fluorescent substance of the present embodiment is preferably such that the β-sialon has a lattice constant a of at least 0.7608 nm and at most 0.7620 nm, and a lattice constant c of at least 0.2908 nm and at most 0.2920 nm. The bigger the crystal lattice size of β-sialon, the more easily it can contain Eu, and in particular, when the lattice constants a and c are in the above-indicated ranges, it can easily contain enough Eu to achieve adequate luminosity and is thus preferable.

The Eu content should preferably be within the range of at least 0.1 mass % and at most 3 mass %. According to the studies performed by the present inventors, adequate luminosity can be achieved if the Eu content is within the aforementioned range.

While the fluorescent substance should preferably contain as much as possible of the β-sialon crystal phase at a high purity, and should be composed of a single β-sialon crystal phase in order to achieve good fluorescence, it can be a mixture containing some unavoidable amorphous phases and other crystal phases, as long as they are within such a range as not to degrade the properties.

When producing the fluorescent substance of the present embodiment, it is necessary to bear in mind that free silicon can have a very detrimental effect, and that β-sialon and silicon nitrides which form the raw material thereof are thermodynamically unstable at high temperatures, making them susceptible to decomposition which will generate silicon. Therefore, when producing the substance, decomposition is normally suppressed by raising the partial pressure of nitrogen in the production atmosphere.

Since silicon absorbs light in a broad range of wavelengths from UV to visible light and converts it to heat, the presence of even minute amounts in the fluorescent substance can greatly hamper the generation of fluorescent light. According to the results of an analysis performed by the present inventors, when evaluated by powder x-ray diffraction, the intensity of the diffraction line for the (111) facet of silicon should preferably be 1% or less compared to the diffraction line intensity for the (101) facet of β-sialon.

Regarding crystal phases different from β-sialon side from silicon, they should all preferably have diffraction line intensities of 10% or less compared to the diffraction line intensity of the (101) facet of β-sialon.

The fluorescent substance of the present embodiment should preferably have a particle size distribution as measured by laser diffraction/scattering such that the volume cumulative 50% diameter (D50) is at least 6 μm, and the 10% diameter (D10) is at least 4 μm. Since particles of a few microns or less not only have a low luminescence intensity of the fluorescent substance itself due to the influence of crystal defects and the like, they are close in size to the wavelengths of visible light, so by assembling an LED using fluorescent substances having a low content of such small particles, it is possible to supress strong scattering of light in layers containing the fluorescent substance, and thereby improve the luminous efficiency (light extraction efficiency) of the LED.

Additionally, the fluorescent substance of the present embodiment preferably has a D50 of 30 μm or less. By adjusting the D50 to be 30 μm or less, it can be more easily mixed uniformly into the resin sealing the LED, thus reducing color disparities in the LED and non-uniformities in the color of illuminated surfaces.

Generally, β-sialons are obtained by heating a mixed powder consisting of silicon nitride, aluminum nitride, aluminum oxide or silicon oxide at a high temperature in a nitrogen atmosphere to induce a reaction. During the temperature increase stage, a portion of the constituents form a liquid phase, through which matter can move to generate a solid solution of β-sialon. As a result, the β-sialon as synthesized forms secondary particles of a complex shape in which a plurality of primary particles (monocrystalline particles) have been sintered together. Accordingly, in order to put the fluorescent substance into the above-indicated particle size range, it must be crushed and classified.

Furthermore, in the fluorescent substance of the present embodiment, in addition to having the aforementioned particle size, the fluorescent substance powder should preferably have a specific surface area of 0.5 m$^2$/g or less. This is because assuming the same particle size, particles composed of monocrystalline particles or particles formed from a small number of relatively large primary particles will have a higher luminous efficiency than particles formed from a large number of small primary particles. Additionally, the smoother the surface of the particles of the fluorescent substance, the more the scattering of light at the particle surface is suppressed, thus not only raising the efficiency of receiving excitation light into the particles, but also increasing the tightness of contact at the boundary between the fluorescent substance particles and the sealing resin when assembling an LED. The primary particle size and particle surface smoothness are significantly correlated with the specific surface area, in view of which the specific surface area should preferably be within the aforementioned range.

<Fluorescent Substance Production Method>

Next, an example of a method for obtaining the fluorescent substance of the present invention shall be explained.

A first step is a step of producing an Eu-containing β-sialon. While this can be performed using conventionally known production methods, a specific example is the method to be explained below. The method involves mixing together various raw materials to obtain a mixed composition containing as the main constituents Si, Al, N, O and Eu which are the constituent elements of Eu-containing β-sialon, and including unavoidable impurities, then heating the resulting mixed composition in a nitrogen atmosphere to synthesis an Eu-containing β-sialon.

While the temperature of heating as mentioned above cannot be defined uniformly because it will differ according to the desired composition of the Eu-containing β-sialon, a stable green fluorescent substance can generally be obtained in a temperature range of at least 1820° C. and at most 2200° C. If the heating temperature is at least 1820° C., the Eu can enter into the β-sialon crystals to result in a fluorescent substance having adequate luminosity. If the heating temperature is at most 2200° C., then there is no need to suppress the decomposition of β-sialon by applying an extremely high nitrogen pressure, and thus no need for any special equipment, which is favorable for industrial reasons.

The raw materials may be those that are publicly known, such as silicon nitride ($Si_3N_4$), aluminum nitride (AlN), silicon oxide ($SiO_2$) and/or aluminum oxide ($Al_2O_3$), the Eu compounds may be chosen from among metals, oxides, carbonates, nitrides and oxynitrides of Eu. These are mixed so as to achieve a designated β-sialon composition after the reaction.

When mixing the above-indicated starting materials, it is possible to use a method of dry mixing, or a method of wet mixing in an inert solvent that does not substantially react with the raw material ingredients followed by removal of the solvent. The mixing equipment may be a V-type mixer, a rocking mixer, a ball mill or a vibrating mill.

After drying the aforementioned mixed raw material powder if needed, it can be loaded into a container such as a crucible composed of boron nitride on at least the surfaces contacting the raw materials, then heated in a nitrogen atmosphere to promote a solid solution reaction in the raw material powder, thus result in β-sialon. The mixed raw material powder should be loaded into the container in as much bulk as possible in order to inhibit sintering between the particles in the solid solution reaction. Specifically, the mixed raw material powder should preferably be loaded into the synthesis container such that the bulk density is 0.8 g/cm$^3$.

The substance as synthesized will be in the form of grains or lumps. These can be subjected to a combination of crushing, powdering and/or classifying to obtain a powder of a predetermined size. In order to be used favorably as a fluorescent substance for an LED, the particle size distribution must be such as to have the D50 and D10 values designated above, but the final particle size adjustment should preferably be performed by the crystal defect removal step to be described below, wherein the processing should make the D50 about 30 μm or less.

As an example of specific processing, the synthesized substance can be classified using a sieve with apertures of 45 μm, and the powder that has passed through the sieve can be sent to the next process, or the synthesized substance can be crushed to a predetermined particle size using a common pulverizer such as a ball mill, a vibrating mill or a jet mill. In the latter method, excessive powdering will not only generate microparticles that can easily scatter light, but will also generate crystal defects on the particle surface, thus reducing the luminous efficiency. According to an analysis by the present inventors, powders obtained only by classifying with a sieve without undergoing a powdering process and by crushing to a D50 of at least about 6 μm with a jet mill ultimately exhibited high luminous efficiency.

A fluorescent substance containing an Eu-containing β-sialon synthesized by the method of the above example was subjected to a second process of reducing the crystal defects and decreasing the spin density at g=2.00±0.02 as measured by ESR spectroscopy.

In a second step, a preferable first embodiment involves subjecting the fluorescent substance powder synthesized in the first step to a heat treatment in the temperature range of at least 1450° C. and at most 1650° C. in a nitrogen atmosphere. At a temperature of at least 1450° C., the matter is more easily diffused so the crystal defect reduction effect is greater, and if the processing is at 1650° C. or less, the sintering between particles can be prevented, thus preventing the secondary particles from becoming too large and the crystal defect concentration from increasing. The heat treatment time should preferably be such that the above temperature range is maintained for at least one hour. By maintaining for at least one hour, a sufficient crystal defect reduction effect can be obtained.

According to an analysis by the present inventors, the crystal defect concentration can be effectively reduced by setting the pressure of the nitrogen atmosphere near atmospheric pressure, and preferably at least 1 atm and at most 3 atm.

As a preferable second embodiment of the second step for reducing crystal defects, the following method is also useful.

The fluorescent substance containing Eu-containing β-sialon obtained in the first step is subjected to a heat treatment of at least 1200° C. and at most 1550° C. in a vacuum, then to an acid treatment.

Due to the heat treatment in this step, the number of unpaired electrons at g=2.00±0.02 measured by ESR spectroscopy is largely reduced. However, under these conditions, partial decomposition of the β-sialon generates Si. Since Si absorbs light in a wide range of wavelengths from UV to visible light, it can greatly reduce the luminosity if present in the fluorescent substance. Thus, a fluorescent substance of high luminosity can be obtained by dissolving and removing the Si generated by decomposition of β-sialon by means of an acid treatment.

The reason that a heat treatment in a vacuum reduces the crystal defect density is believed to be as follows. At high temperatures and low pressures, β-sialon becomes thermodynamically unstable, and thus breaks down into Si, N$_2$, AlN and polytypes thereof, but decomposes more easily with a higher crystal defect concentration. Therefore, by adjusting the heat treatment temperature and degree of vacuum, it is possible to selectively decompose only those portions with a high crystal defect concentration, thereby reducing the crystal defect density.

While the suitable heat treatment temperature will differ depending on the degree of vacuum, it should preferably be in the temperature range of at least 1200° C. and at most 1550° C. At 1200° C. or more, the decomposition of β-sialon progresses and the crystal defect density is reduced. At 1550° C. or less, sudden breakdowns of β-sialon can be suppressed.

As a preferable third embodiment for the second step for reducing crystal defects, the following method is also useful.

The fluorescent substance containing the Eu-containing β-sialon obtained in the first step is subjected to a heat treatment of at least 1300° C. and at most 1600° C. in an inert atmosphere having as its main component a gas other than nitrogen, with a partial pressure for nitrogen of at most 10 kPa, then to an acid treatment.

The effects of this step are exactly the same as the aforementioned step of heat treatment in a vacuum, and by reducing the partial pressure of nitrogen in the heat treatment atmosphere, raises the crystal defect concentration and causes decomposition of unstable nitride and oxynitride phases.

According to an analysis by the present inventors, it is crucial to adjust the heat treatment conditions so that the amount of Si after heating is within the range of at least 1 wt % and at most 30 wt % in order to reduce the crystal defect density.

The removal of Si generated by thermal decomposition of β-sialon can be achieved by using publicly known techniques such as dissolution and removal by means of acids or alkalis. Among these, dissolution by a mixture of hydrofluoric acid and nitric acid is preferable for being capable of quickly removing Si, and being capable of removing AlN polytypes which tend to be formed as a byproduct of β-sialon synthesis.

While the heat treatment in the first step and the heat treatment in the second step may be performed sequentially upon cooling after heating in the above-described first step, it is more effective to perform the heat treatment after adjusting to a predetermined particle size. This is because it enables not only the crystal defects formed during baking, but also the crystal defects formed during crushing and powdering to be removed. During the heat treatment of the second step, the sintering between particles does not progress at all, and the particle size remains mostly unchanged from before the heat treatment, so there is no need to perform particle size adjustment again after the heat treatment.

<Light-Emitting Device>

The fluorescent substance having β-sialon as the main constituent in the present embodiment is used in a light-emitting device having a light source and a fluorescent substance, and in particular has the luminescence property of generating light having a peak wavelength in the range of at least 520 nm and at most 550 nm when irradiated with an excitation source in the form of UV or visible light containing wavelengths of at least 350 nm and at most 500 nm, so it can easily achieve a white light when combined with a UV LED or blue LED, in further combination with a red fluorescent substance and/or a blue fluorescent substance as needed.

Additionally, since β-sialon has little loss in luminosity at high temperatures, light-emitting devices using this substance will have little loss in luminosity or color shifting, will not degrade even when exposed to high temperatures, and furthermore excels in heat resistance and in long-term stability in oxidized atmospheres and aqueous environments, as a result of which the light-emitting device also has a high luminosity and long life.

The light-emitting device of the present embodiment is formed using at least one light source and a fluorescent substance having as its main constituent the β-sialon of the present embodiment. The light-emitting device of the present embodiment includes LEDs, fluorescent lamps and the like. For example, an LED using the fluorescent substance of the present embodiment can be produced by a publicly known method as described in Japanese Patent Application, Publication No. H5-152609A, Japanese Patent Application, Publication No. H7-99345A and Japanese Patent No. 2927279. In this case, a UV LED or blue LED emitting light at a wavelength of at least 350 nm and at most 500 nm, more preferably a blue LED emitting light at a wavelength of at least 440 nm and at most 480 nm, should be used as the light source. Examples of such light-emitting device include nitride semiconductors such as GaN and InGaN, the compositions of which can be adjusted to form light sources emitting light in predetermined wavelengths.

Aside from simply using the above-described light-emitting device with only the fluorescent substance of the present embodiment, it can be combined with a fluorescent substance having other luminescence properties to construct a light-emitting device emitting a desired color. In particular, when a blue LED is used as the excitation source, the fluorescent substance of the present embodiment can be combined with a yellow fluorescent substance having an emission peak in the range of at least 575 nm and at most 590 nm, thereby resulting in a white light with a wide range of color temperatures. An example of such a fluorescent substance is a solid solution of Eu in α-sialon.

Additionally, by further combining a red fluorescent substance having an emission peak wavelength of at least 600 nm and at most 700 nm, for example by combining with $CaAlSiN_3$:Eu or the like, an improvement in the color rendering and color reproducibility is achieved, thus offering a white light source that has good color rendering properties making it suitable for various types of indoor and outdoor illumination, good color reproducibility making it suitable as a backlight light source in liquid crystal display devices, and furthermore excelling in high temperature properties.

<Functions and Effects>

Herebelow, the functions and effects of the present embodiment will be briefly explained again.

The fluorescent substance of the present embodiment has as its main constituent an Eu-containing β-sialon represented by the general formula $Si_{6-z}Al_zO_zN_{8-z}$ characterized by having a spin density corresponding to an absorption of g=2.00±0.02 at 25° C. measured by electron spin resonance spectroscopy, of $2.0 \times 10^{17}$/g or less.

A fluorescent substance of this constitution, when excited by light in a broad range of wavelengths from UV to visible light, emits green light with a main wavelength in the range of at least 520 nm and at most 550 nm with high efficiency, and therefore excels as a green fluorescent substance. For this reason, it can be favorably used alone or in combination with other fluorescent substances in various types of light-emitting devices, particularly in white LEDs having UV LEDs or blue LEDs as light sources.

Additionally, the above-described fluorescent substance is preferably such that the main component β-sialon has a lattice constant a of at least 0.7608 nm and at most 0.7620 nm, a lattice constant c of at least 0.2908 nm and at most 0.2920 nm, and an Eu content of at least 0.1 mass % and at most 3 mass %.

As the crystal lattice size of β-sialon becomes greater, it more easily accommodates Eu, and particularly when the lattice constants a and c are within the above-indicated ranges, it can easily contain enough Eu to achieve adequate luminosity, and is therefore preferable. Additionally, adequate luminosity can be obtained if the Eu content is in the above-given range.

Additionally, the above-described fluorescent substance should be such that when evaluated by powder x-ray diffraction, the intensity of the diffraction line of the (111) facet of silicon is at most 1% of the diffraction line intensity of the (101) facet of β-sialon, and the diffraction line intensities other than those of silicon and β-sialon are at most 10% of the diffraction line intensity of the (101) facet of β-sialon.

Since silicon absorbs light in a broad range of wavelengths from UV to visible light and converts it to heat, the presence of even minuscule amounts in the fluorescent substance greatly hampers the emission of fluorescent light. Conversely, if the diffraction line intensity of the (111) facet of silicon is within the above-indicated range, the luminosity of the fluorescent light will increase. Additionally, if the diffraction line intensities other than those of silicon and β-sialon are within the above-indicated ranges, then that means there are few impurities other than silicon, thus similarly raising the luminosity of the fluorescent light.

Additionally, the fluorescent substance should preferably have a particle size distribution as measured by laser diffraction/scattering such that the volume cumulative 50% diameter (D50) is at least 6 μm, the 10% diameter (D10) is at least 4 μm, and the specific surface area is at most 0.5 $m^2$/g.

When an LED is assembled using such a fluorescent substance with a low content of small particles, the strong scattering of light in the layer containing the fluorescent substance can be suppressed, thus improving the luminous efficiency (light extraction efficiency) of the LED. Additionally, by adjusting the D50 to be 30 μm or less, it can be more easily mixed uniformly into the resin sealing the LED, as well as to reduce the causes of color disparities in the LED and non-uniformities in the color of illuminated surfaces.

Additionally, the light-emitting device of the present embodiment comprises the above-described fluorescent substance and a light source.

A light-emitting device of such a constitution uses the above-described fluorescent substance with β-sialon as the main constituent, so as a reflection of the thermally and chemically stable of β-sialon, it has the characteristics of having little loss of luminosity when used at high temperatures, and a long life span.

Additionally, the above-described light-emitting device preferably includes another fluorescent substance having a peak emission wavelength of at least 600 nm and at most 700 nm in addition to the above-described fluorescent substance, and can use as the above-described light source a light source that emits UV or visible light.

Thus, in the case of a fluorescent substance having β-sialon as its main constituent, it can easily be made to produce a white light by using a blue LED capable of emitting visible light with a wavelength of at least 440 nm and at most 480 nm, or a UV LED capable of emitting UV light with a wavelength of at least 350 nm and at most 410 nm as the light source, or by combining such light sources with a fluorescent substance having β-sialon as the main constituent and other red or blue fluorescent substances as needed. As a result, this light-emitted device is applicable to diverse uses, such as in the backlights for display devices such as liquid crystal displays, or as various types of indoor and outdoor illumination.

Additionally, the method of producing a fluorescent substance according to the present embodiment may comprise a first step of producing an Eu-containing β-sialon, and a second step of subjecting it to a heat treatment of at least 1 hour at a temperature range of at least 1450° C. and at most 1650° C. in a nitrogen atmosphere, to thereby reduce the crystal defect density.

Additionally, the method of producing a fluorescent substance according to the present embodiment may comprise a first step of producing an Eu-containing β-sialon, and a second step of subjecting it to a heat treatment at a temperature range of at least 1200° C. and at most 1550° C. in a vacuum, and further subjecting to an acid treatment, to thereby reduce the crystal defect density.

Additionally, the method of producing a fluorescent substance according to the present embodiment may comprise a first step of producing an Eu-containing β-sialon, and a second step of subjecting it to a heat treatment at a temperature range of at least 1300° C. and at most 1600° C. in an inert atmosphere having as its main component a gas other than nitrogen with a partial pressure for nitrogen of at most 10 kPa, and further subjecting to an acid treatment, to thereby reduce the crystal defect density.

All of the methods of producing fluorescent substances described above are capable of highly reproducibly producing a fluorescent substance excelling in luminescence properties as described above, by performing simple heat treatments and acid treatments on Eu-activated β-sialons obtained by conventionally known production methods.

While embodiments of the present invention have been described above, these are only examples of possible aspects of the present invention. Various constitutions other than those described could just as well be employed.

EXAMPLES

Herebelow, embodiments of the present invention shall be explained with reference to the drawing.

Comparative Example 1

Synthesis of Eu-containing β-sialon 95.5 mass % of an α-silicon nitride powder from Ube Industries (grade "SN-E10", oxygen content 1.2 mass %, β phase content 4.5 mass %), 3.3 mass % of an aluminum nitride powder from Tokuyama (grade "F", oxygen content 0.9 mass %), 0.4 mass % of an aluminum oxide powder from Taimei Chemicals (grade "TM-DAR") and 0.8 mass % of europium oxide powder from Shin-Etsu Chemical (grade "RU") were blended to obtain 1 kg of a raw material mixture.

The above-described raw material mixture was dry-mixed for 60 minutes using a rocking mixer (Aichi Electric RM-10), then passed through a stainless steel sieve with an aperture of 150 μm, to obtain a raw material powder for synthesis of a fluorescent substance. Upon loading the raw material powder into a 100 ml graduated cylinder and dividing the mass of the powder by its bulk volume to find its density, this was found to be 0.4 g/cm$^3$.

160 g of the raw material powder were loaded into a lidded cylindrical boron nitride container with internal measurements of diameter 10 cm×height 10 cm (Denki Kagaku Kogyo, grade "N-1"), and subjected to a heat treatment for 12 hours at 1950° C. in a pressurized nitrogen atmosphere of 0.9 MPa using an electrical furnace with carbon heaters. The resulting product was in the form of a loosely aggregated clump, which was able to be easily crumbled when handled by human hands wearing clean rubber gloves. After lightly crushing in this manner, the powder was passed through a sieve with an aperture of 45 μm. As a result of this operation, 150 g of a synthesized powder were obtained.

50 mg of the synthetic powder obtained as described above were placed in an ESR sample tube, and subjected to ESR measurements at room temperature. The measurements were made using a JEOL JES-FE2XG ESR spectrometer. Additionally, the measurement conditions were as follows.

Magnetic field sweep range: 3200-3400 gauss (320-340 mT)

Magnetic field modulation: 100 kHz, 5 gauss

Radiated microwaves: 10 mW, 9.25 GHz

Sweep time: 240 seconds

Data points: 2048 points

Standard sample: Sample of MgO with thermally dispersed $Mn^{2+}$ was simultaneously measured.

ESR spectra are usually observed as first derivative curves in order to enhance the peaks and troughs in the electromagnetic absorption spectra. Since the absorption is proportionate to the number of spins, the ESR absorption spectra were integrated twice to change the derivative curves to integral curves, in order to determine the amounts from the area ratio with the standard sample.

The number of spins in the standard sample was determined by performing an ESR measurement on 0.5 ml of a $1.0 \times 10^{-5}$ mol/L benzene solution of 1,1-diphenyl-2-picrylhydrazyl (($C_6H_5$)$_2$NN$C_6H_2$($N_2$)$_3$, hereinafter abbreviated to "DPPH"), having a known number of spins ($3.0 \times 10^{15}$ spins), and using the peak area ratio between the standard sample and the DPPH solution.

The spin density of Comparative Example 1 for absorption g=2.00±0.02 was found to be $3.0 \times 10^{17}$/g.

Powder x-ray diffraction (XRD) using the Kα lines of copper was performed on the synthesized powder of Comparative Example 1, and upon identifying the crystal phases and measuring the lattice constants of β-sialon, crystal phases were observed for β-sialon, and as secondary phases, many small diffraction lines were observed in the neighborhood of 2θ=33-38°. Among these, even the strongest diffraction line had an intensity of at most 1% with respect to the diffraction line intensity of the (101) facet of β-sialon. The lattice constants were a=0.7612 nm and c=0.2912 nm. The Eu content as determined by ICP emission spectrometry was 0.60 mass %, and the average particle size as determined from particle size distribution measurements by laser scattering was 19 μm.

Figure 1:
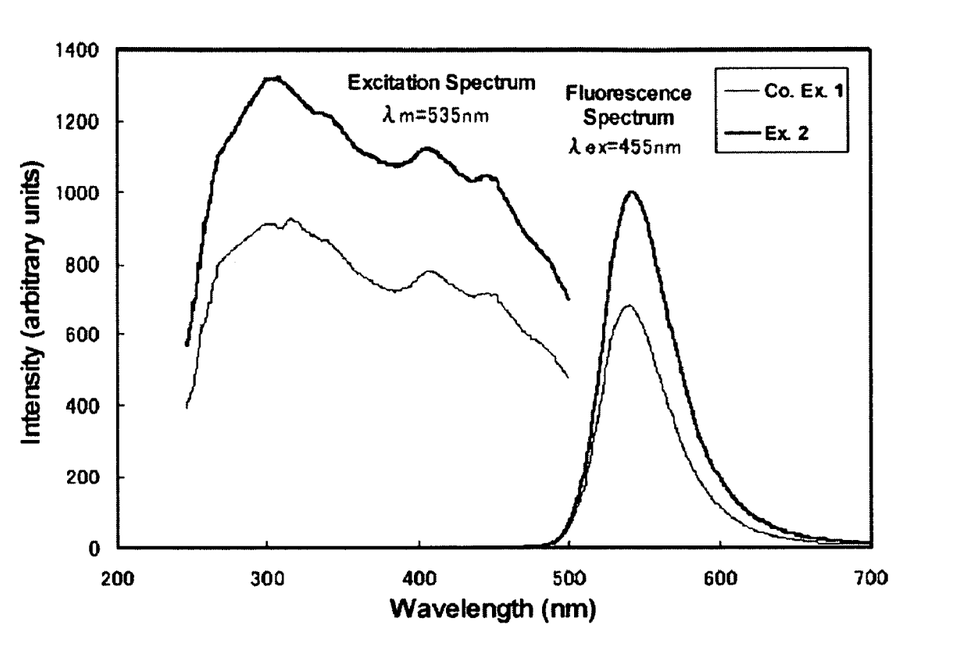
FIG. 1 is a graph showing the excitation spectrum (monitored at a wavelength of 535 nm) and emission spectrum (excited at a wavelength of 455 nm) of fluorescent powders according to Comparative Example 1 and Example 2.

Next, a fluorescence spectrophotometer (Hitachi High-Tech F4500) was used to perform measurements of the excitation/fluorescence spectrum. FIG. 1 shows the results of a measurement of the excitation/fluorescence spectrum of the fluorescent substance powder obtained in Comparative Example 1. The fluorescent substance of Comparative Example 1 was excited by a wide range of wavelengths from UV to blue, and exhibited a relatively sharp fluorescence spectrum with a peak wavelength of 540 nm and a half-width of 54 nm. The CIE chromaticity determined from the fluorescence spectrum in the case of excitation at 450 nm was green at x=0.337 and y=0.635. Next, the total luminous flux of the fluorescent substance of Comparative Example 1 was measured using integrating spheres (Reference Document: Kazuaki Ōkubo et al., "NBS hyōjun keikōtai no ryōshi kōritsu no sokutei", Journal of Illuminating Engineering Institute of Japan, 1999, vol. 83, no. 2, pp. 87-93). The excitation beam was a spectralized xenon lamp source. When excited with near-UV light with a wavelength of 405 nm, the absorption, internal quantum efficiency and luminous efficiency were respectively 84%, 42% and 34%, and when excited with blue light with a wavelength of 450 nm, they were respectively 82%, 39% and 28%.

Example 1

20 g of the powder synthesized in Comparative Example 1 were loaded into a lidded cylindrical boron nitride container with internal measurements of diameter 60 cm×height 40 cm (Denki Kagaku Kogyo, grade "N-1"), and subjected to a heat treatment for 8 hours at 1600° C. in a nitrogen atmosphere at atmospheric pressure in an electrical furnace with carbon heaters. The resulting powder did not undergo contraction which accompanies sintering, having mostly the same properties as before heating, and entirely passed through a sieve with an aperture of 45 µm.

Comparative Example 2

A heat treatment was performed under exactly the same conditions as Example 1 aside from being for 8 hours at 1950° C. in an $N_2$ gas atmosphere of 9 atm. The resulting powder was observed to have some contraction between particles as accompanies sintering, and the rate of passage through a sieve with an aperture of 45 µm was about 60%.

Comparative Example 3

A heat treatment was performed under exactly the same conditions as Example 1 aside from being for 8 hours at 1400° C. in a vacuum of 1 Pa. The color of the resulting powder changed from green before the treatment to a brownish green. The resulting powder did not undergo contraction which accompanies sintering, and entirely passed through a sieve with an aperture of 45 µm. As a result of XRD measurements, minute amounts of Si were detected.

Example 2

The powder obtained in Comparative Example 3 was treated with a 1:1 acid mixture of 50% hydrofluoric acid and 70% nitric acid. During the treatment, the suspension changed from a brownish green color to a bright green. This was rinsed and dried to obtain a fluorescent substance powder. FIG. 1 shows the results of an excitation/fluorescence spectrum measurement on the fluorescent substance powder obtained in Example 2.

Example 3

A heat treatment was performed under exactly the same conditions as Example 1 aside from being for 8 hours at 1450° C. in an argon atmosphere at atmospheric pressure. The color of the resulting powder changed from green before the treatment to a dark green. The resulting powder did not undergo contraction which accompanies sintering, and entirely passed through a sieve with an aperture of 45 µm.

The powder obtained in this way was treated with a 1:1 acid mixture of 50% hydrofluoric acid and 70% nitric acid. This was rinsed and dried to obtain a fluorescent substance powder.

Comparative Example 4

A powder having β-sialon as the main constituent was synthesized under exactly the same conditions as Comparative Example 1, aside from the fact that the raw materials did not contain a europium oxide powder.

Comparative Example 5

The powder obtained in Comparative Example 2 was subjected to a heat treatment under exactly the same conditions as Example 1, to obtain a powder.

Table 1 shows the spin density for an absorption of g=2.00±0.02 at room temperature in ESR spectroscopy, the results of XRD measurements, the Eu content determined by ICP emission spectrometry and the average particle size measured by a particle size analizer, Table 2 shows the fluorescence properties as measured by a fluorescence spectrophotometer, and Table 3 shows the results of measurement of quantum efficiency, for the powders of Examples 1-3 and Comparative Examples 1-5.

TABLE 1

|  | Spin Density (spins/g) | XRD Measurements Type* | Lattice Constant a (nm) | Lattice Constant c (nm) | Eu Content (mass %) | Average Particle Size (µm) |
|---|---|---|---|---|---|---|
| Comparative Example 1 | $3.0 \times 10^{17}$ | β, AlN polytype (<1%) | 0.7612 | 0.2912 | 0.60 | 19 |
| Example 1 | $1.4 \times 10^{17}$ | β, AlN polytype (<1%) | 0.7611 | 0.2913 | 0.60 | 19 |
| Comparative Example 2 | $3.2 \times 10^{17}$ | β, AlN polytype (<1%) | 0.7610 | 0.2912 | 0.58 | 26 |
| Comparative Example 3 | $8.8 \times 10^{17}$ | β, AlN polytype (<1%), Si | 0.7611 | 0.2912 | 0.65 | 18 |

TABLE 1-continued

| | Spin Density (spins/g) | Type* | Lattice Constant a (nm) | Lattice Constant c (nm) | Eu Content (mass %) | Average Particle Size (μm) |
|---|---|---|---|---|---|---|
| Example 2 | $8.7 \times 10^{16}$ | (6.5%) β single phase | 0.7612 | 0.2912 | 0.58 | 18 |
| Example 3 | $7.9 \times 10^{16}$ | β single phase | 0.7612 | 0.2912 | 0.52 | 18 |
| Comparative Example 4 | $6.5 \times 10^{16}$ | β, AlN polytype (<1%) | 0.7609 | 0.2910 | ND | 10 |
| Comparative Example 5 | $1.2 \times 10^{16}$ | β single phase | 0.7609 | 0.2909 | ND | 11 |

*The numbers inside the parentheses after AlN polytype and Si represent the proportional intensity of the strongest diffraction line with respect to the diffraction line intensity of the (101) facet of β-sialon.

TABLE 2

| | Relative Peak Intensity (%) | Peak Wavelength (nm) | Half-width (nm) | CIE 1931 chromaticity x | CIE1931 chromaticity y |
|---|---|---|---|---|---|
| Comparative Example 1 | 100 | 540 | 54 | 0.337 | 0.635 |
| Example 1 | 130 | 541 | 54 | 0.341 | 0.631 |
| Comparative Example 2 | 90 | 541 | 54 | 0.344 | 0.629 |
| Comparative Example 3 | 10 | 537 | 57 | 0.302 | 0.582 |
| Example 2 | 150 | 542 | 55 | 0.347 | 0.628 |
| Example 3 | 160 | 543 | 54 | 0.350 | 0.625 |
| Comparative Example 4 | no fluorescent emissions | | | | |
| Comparative Example 5 | no fluorescent emissions | | | | |

TABLE 3

| | Excitation 405 nm | | | Excitation 450 nm | | |
|---|---|---|---|---|---|---|
| | Absorption (%) | Internal Quantum Efficiency (%) | Luminous Efficiency (%) | Absorption (%) | Internal Quantum Efficiency (%) | Luminous Efficiency (%) |
| Comparative Example 1 | 84 | 42 | 34 | 72 | 39 | 28 |
| Example 1 | 83 | 59 | 49 | 73 | 57 | 42 |
| Comparative Example 2 | 84 | 37 | 31 | 72 | 36 | 26 |
| Comparative Example 3 | 91 | 3 | 3 | 90 | 2 | 2 |
| Example 2 | 84 | 71 | 60 | 73 | 69 | 50 |
| Example 3 | 85 | 77 | 65 | 75 | 70 | 53 |

When a fluorescent substance synthesized by a conventional method (Comparative Example 1) was subjected to a further heat treatment at a temperature 350° C. lower than the synthesis temperature (Example 1), the spin density decreased without any changes in the crystal phase, crystal lattice size, Eu content and particle size and shape. With reductions in the spin density caused by lattice defects, the internal quantum efficiency increased, and the luminous efficiency improved.

When the fluorescent substance of Comparative Example 1 was subjected to a heat treatment at the temperature of synthesis 1950° C. (Comparative Example 2), there were no definitive changes in the crystal phase, crystal lattice size and Eu content, but grain growth and sintering between particles (enlargement of secondary particles) progressed. With this heat treatment, the spin density remained mostly unchanged, and no improvement was observed in the luminous efficiency.

Upon subjecting the fluorescent substance of Comparative Example 1 to a heat treatment at 1400° C. (Comparative Example 3), partial decomposition of the β-sialon produced small amounts of Si. Since this Si absorbs visible light in a wide range of wavelengths (without emission), the luminous efficiency was extremely low. However, the spin density was reduced by the heat treatment and the Si was dissolved and removed by the acid treatment (Example 2), as a result of which the internal quantum efficiency increased significantly and the luminous efficiency improved compared to the fluorescent substance of Comparative Example 1. At that time, no changes were observed in the emitted color and the shape of the emission spectrum as shown in FIG. 1.

Upon subjecting the fluorescent substance of Comparative Example 1 to a heat treatment at 1450° C. in an argon atmosphere at atmospheric pressure, a small amount of Si was produced as with Comparative Example 3, but this Si was dissolved and removed by a further acid treatment (Example 3), as a result of which, as with Example 2, the internal quantum efficiency significantly increased, and the luminous efficiency improved. The heat treatments in vacuum and in an argon atmosphere exhibited similar behaviors. In other words, the two both demonstrate that a heat treatment under conditions of a low partial pressure for nitrogen is effective for improving the properties.

The synthesized powder not containing Eu of Comparative Example 4 had a lower spin density than Comparative Example 1 synthesized under the same conditions, indicating that the solid solution of Eu in β-sialon itself forms new crystal defects. However, in that case, although the spin density is low, there is no $Eu^{2+}$ which forms the luminescent centers, so fluorescent emissions do not occur. Additionally, even when there is no Eu, the spin density is reduced after a vacuum heat treatment (Comparative Example 5), so this sort of treatment is effective for the reduction of crystal defects unrelated to the solid solution of Eu.

According to the excitation/fluorescence spectra of FIG. 1, a fluorescent substance having β-sialon as the main constituent can be made to emit a strong green light using a UV LED or blue LED emitting light having a wavelength of 350-500 nm as the excitation beam. Thus, a white LED with good emission properties can be achieved using a blue or UV light-emitting diode as the excitation light source for the fluorescent substance of the above-described example, or using the fluorescent substance of the above-described example in combination with other fluorescent substances emitting other colors.

Example 4

The fluorescent substance obtained in Example 2 and a Ca-α-sialon:Eu fluorescent substance having the composition $Ca_{0.66}Eu_{0.04}Si_{9.9}Al_{2.1}O_{0.7}N_{15.3}$ (emission peak wavelength: 585 nm, luminous efficiency when excited at 450 nm: 60%) were respectively treated with a silane coupling agent (Shin-Etsu Silicone KBE402). These two types of fluorescent substance treated with a silane coupling agent were kneaded into an epoxy resin in various proportions (Sanyu Rec NLD-SL-2101), potted onto a blue LED device of emission wavelength 450 nm, vacuum deaerated and thermally cured to produce a surface-mounted LED (light-emitting device) of Example 4.

Comparative Example 6

Additionally, the fluorescent substance of Example 2 in the light-emitting device of Example 4 was replaced by the fluorescent substance of Comparative Example 1 to produce a white light-emitting device of Comparative Example 6.

The light-emitting devices of Example 4 and Comparative Example 6 were lit under the same electrical conditions, and their central illuminance and chromaticity (CIE1931) under identical conditions were measured by a luminometer. When the central illuminance was compared with a white light-emitting device with chromaticity coordinates (x, y) of (0.31, 0.32), the light-emitting device of Example 4 was found to be 1.5 times brighter than the light-emitting device of Comparative Example 6.

Example 5

The fluorescent substance obtained in Example 2 and a red fluorescent substance having the composition Ca0.992Eu0.008AlSiN3 (emission peak wavelength: 650 nm, luminous efficiency when excited at 450 nm: 70%), were used to prepare the white light-emitting device of Example 5 with chromaticity coordinates (x, y) of (0.31, 0.32) by means of the same method as Example 4. The light-emitting device of Example 5 had excellent color rendering as compared to the light-emitting devices of Example 4 and Comparative Example 6.

Examples 6-8

95.4 mass % of an α-silicon nitride powder from Ube Industries (grade "SN-E10", oxygen content 1.2 mass %, β phase content 4.5 mass %), 3.3 mass % of an aluminum nitride powder from Tokuyama (grade "E", oxygen content 0.8 mass %), 0.7 mass % of an aluminum oxide powder from Taimei Chemicals (grade "TM-DAR") and 0.8 mass % of europium oxide powder from Shin-Etsu Chemical (grade "RU") were blended to obtain 1 kg of a raw material mixture.

Above-described raw material mixture was dry-mixed for 30 minutes using a V-type mixer, and entirely passed through a sieve of aperture 150 μm. 900 g were loaded into a into a lidded cylindrical boron nitride container with internal measurements of diameter 16 cm×height 16 cm (Denki Kagaku Kogyo, grade "N-1"), and subjected to a heat treatment for 15 hours at 2000° C. in a pressurized nitrogen atmosphere of 0.9 MPa using an electrical furnace with carbon heaters. The resulting product was in the form of a loosely aggregated clump, which was able to be easily crumbled when handled by human hands wearing clean rubber gloves. After lightly crushing in this manner, the powder was passed through a sieve with an aperture of 150 μm. As a result of this operation, about 880 g of a synthesized powder were obtained.

Additionally, the above-mentioned synthesized powder was crushed with an supersonic jet mill (Nippon Pneumatic PJM-80SP) to obtain a crushed powder of Examples 6-8. This pulverizer is capable of controlling the particle size of the crushed powder by the speed of supplying the sample to the pulverizing chamber and the pulverizing air pressure. The pulverizing conditions and particle size distribution of the crushed powders are shown in Table 4.

TABLE 4

| | Pulverizing Conditions | | Particle Size Distribution (μm) | | |
|---|---|---|---|---|---|
| | Sample Supply Rate (g/h) | Pulverizing Air Pressure (MPa) | D10 | D50 | D90 |
| Example 6 | 3000 | 0.2 | 4.9 | 11.2 | 23.2 |
| Example 7 | 480 | 0.5 | 4.3 | 8.0 | 12.2 |
| Example 8 | 250 | 0.6 | 2.8 | 5.1 | 9.8 |

The crushed powders described above, as with Example 3, were subjected to a heat treatment in an argon atmosphere at atmospheric pressure and to a treatment with an acid mixture of hydrofluoric acid and nitric acid. The spin densities for ESR spectroscopy at an absorption of g=2.00±0.02 at room temperature were all less than $1×10^{-17}$/g, and XRD measurements found that the crystal phases were all a β-sialon single phase, with a lattice constant a of 0.7610 nm and a lattice constant c of 0.2913 nm. The particle size distributions measured by a particle size analyzer and the specific surface area measured by gas adsorption and determined by BET multi-point analysis are shown in Table 5, and the fluorescence properties when excited by blue light of wavelength 450 nm are shown in Table 6.

TABLE 5

| | Specific Surface Area (m²/g) | Particle Size Distribution (μm) | | |
|---|---|---|---|---|
| | | D10 | D50 | D90 |
| Example 6 | 0.28 | 5.2 | 11.7 | 24.0 |
| Example 7 | 0.45 | 4.6 | 8.2 | 12.8 |
| Example 8 | 0.76 | 3.0 | 5.2 | 10.0 |

TABLE 6

| | Relative Peak Intensity (%) | Half-width (nm) | CIE1931 Chromaticity x | y | Absorption (%) | Internal Quantum Efficiency (%) | Luminous Efficiency |
|---|---|---|---|---|---|---|---|
| Example 6 | 167 | 55 | 0.352 | 0.625 | 69 | 77 | 53 |
| Example 7 | 150 | 55 | 0.345 | 0.628 | 65 | 78 | 51 |
| Example 8 | 126 | 55 | 0.338 | 0.630 | 49 | 80 | 39 |

Under the extremely weak pulverization conditions of Example 6, the secondary particles are simply separated into primary particles, and the destruction of the primary particles does not progress. Therefore, while the average particle size may be small compared to uncrushed fluorescent substances (e.g., Example 3), it achieves the about the same level of fluorescence. When the pulverization conditions are further enhanced, the particle size of the fluorescent substance is reduced, thus reducing the luminous efficiency, especially the absorption efficiency.

Examples 9 and 10

The fluorescent substances of Example 6 and Example 8 were subjected to microparticle removal by wet precipitation (respectively Example 9 and Example 10). 10 g of the fluorescent substance powder was well-dispersed in 500 ml of distilled water to which sodium hexamethaphosphate was added as dispersant, after which the result was transferred to a container of inner diameter 80 mm and height 140 mm, let stand for 12 minutes in the case of Example 9 and for 80 minutes in the case of Example 10, and 90 mm of the supernatant liquid removed from the surface. The procedure of again adding an aqueous solution of sodium hexamethaphosphate, dispersing, letting stand for a predetermined time, and removing the supernatant liquid, until the supernatant became transparent. Then, the precipitants were filtered and rinsed well to remove the dispersant, and dried to obtain a fluorescent substance powder with microparticles removed. The Eu content determined by ICP emission spectrometry, the particle size distribution measured by a particle size analyzer and the specific surface area measured by gas adsorption and determined by BET multi-point analysis are shown in Table 7, and the fluorescence properties when excited with a blue light of wavelength 450 nm are shown in Table 8.

TABLE 7

| | Specific Surface Area (m²/g) | Particle Size Distribution (μm) | | |
|---|---|---|---|---|
| | | D10 | D50 | D90 |
| Example 9 | 0.24 | 8.4 | 15.0 | 26.4 |
| Example 10 | 0.40 | 4.4 | 7.2 | 11.8 |

TABLE 8

| | Relative Peak Intensity (%) | Half-width (nm) | CIE1931 Chromaticity x | y | Absorption (%) | Internal Quantum Efficiency (%) | Luminous Efficiency |
|---|---|---|---|---|---|---|---|
| Example 9 | 190 | 55 | 0.357 | 0.623 | 72 | 80 | 58 |
| Example 10 | 154 | 55 | 0.348 | 0.626 | 60 | 82 | 49 |

As seen in Table 7 and Table 8, the fluorescence properties were improved upon removal of microparticles from the fluorescent substance powder.

The present invention has been explained with reference to examples above. These examples are only exemplifications of specific possibilities, and those skilled in the art will recognize that various modifications are possible, and that such modifications are also covered by the present invention.

Industrial Applicability

The fluorescent substance having β-sialon as its main constituent according to the present invention, when excited by light of a broad range of wavelengths from UV to blue, emits a very bright green light, and is therefore suitable for use as a fluorescent substance in white LEDs having blue or UV light as the light source, which can be suitably used in illumination equipment and image display devices.

Furthermore, since the fluorescent substance of the present invention has little loss of luminosity at high temperatures and excels in heat resistance and humidity resistance, when applied to the fields of illumination equipment and image display devices mentioned above, there will be little change in the brightness and emitted color caused by changed in the ambient temperature, and they will be able to provide the property of excelling in long-term stability.

Furthermore, the method of manufacturing a fluorescent substance according to the present invention can stably offer a fluorescent substance having the aforementioned characteristics, and is therefore very useful to industry.

The invention claimed is:

1. A fluorescent substance having as a main constituent a β-sialon represented by the general formula $Si_{6-z}Al_zO_zN_{8-z}$ and containing Eu, wherein z is 0-4.2, further wherein the spin density is $2.0 \times 10^{17}$/g or less as measured by electron spin resonance spectroscopy corresponding to an absorption of g=2.00±0.02 at 25° C., and the particle size distribution as measured by laser diffraction/scattering is such that the weight cumulative 50% diameter (D50) is at least 6 μm and at most 30 μm, the 10% diameter (D10) is at least 4 μm, and the specific area is 0.5 m2/g or less.

2. A fluorescent substance in accordance with claim 1, wherein said β-sialon has a lattice constant a of at least 0.7608 and at most 0.7620, a lattice constant c of at least 0.2908 and at most 0.2920, and an Eu content of at least 0.1 mass % and at most 3 mass %.

3. A fluorescent substance in accordance with claim 1, wherein upon evaluation by powder x-ray diffraction, the intensity of the diffraction line for the (111) facet of silicon is 1% or less with respect to the intensity of the diffraction line for the (101) facet of β-sialon.

4. A fluorescent substance in accordance with claim 1, wherein upon evaluation by powder x-ray diffraction, the intensities of diffraction lines other than those of said β-sialon and silicon are 10% or less with respect to the intensity of the diffraction line for the (101) facet of β-sialon.

5. A light-emitting device comprising a fluorescent substance in accordance with claim 1, and a light source.

6. A light-emitting device in accordance with claim 5, comprising, in addition to said fluorescent substance, another fluorescent substance having an emission peak wavelength of at least 600 nm and at most 700 nm.

7. A light-emitting device in accordance with claim 5, using as said light source a light source that radiates ultraviolet or visible light.

8. A method of producing a fluorescent substance, comprising a first step of forming a β-sialon containing Eu, and a second step of subjecting it to a heat treatment in a temperature range of at least 1200° C. and at most 1550° C. in a vacuum, and further subjecting it to an acid treatment to reduce the crystal defect density.

9. A method of producing fluorescent substance, comprising a first step of forming a β-sialon containing Eu, and a second step of subjecting it to a heat treatment in a temperature range of at least 1300° C. and at most 1600° C. in an inert gas atmosphere having a gas other than nitrogen as its main constituent with a partial pressure for nitrogen of 10 kPa or less, and further subjecting it to an acid treatment to reduce the crystal defect density.

* * * * *